(12) United States Patent
Niu et al.

(10) Patent No.: US 7,905,361 B2
(45) Date of Patent: Mar. 15, 2011

(54) MODIFIED POLYAMIDE MEMBRANE

(75) Inventors: Q. Jason Niu, Chanhassen, MN (US); William E. Mickols, Chanhassen, MN (US); Chunming Zhang, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 12/023,082

(22) Filed: Jan. 31, 2008

(65) Prior Publication Data

US 2008/0185332 A1    Aug. 7, 2008

Related U.S. Application Data

(60) Provisional application No. 60/899,451, filed on Feb. 5, 2007.

(51) Int. Cl.
 *B01D 39/14*    (2006.01)

(52) U.S. Cl. ........... 210/500.38; 210/500.37; 210/500.1; 210/650; 210/652

(58) Field of Classification Search ............. 210/500.38, 210/500.1, 500.37, 650, 652
See application file for complete search history.

(56) References Cited

U.S. PATENT DOCUMENTS

| | | | |
|---|---|---|---|
| 4,277,344 A | | 7/1981 | Cadotte |
| 4,485,220 A | * | 11/1984 | Hefner et al. .................. 525/411 |
| 4,678,833 A | * | 7/1987 | McCreedy et al. ............. 525/66 |
| 4,704,324 A | * | 11/1987 | Davis et al. ................. 428/308.4 |
| 4,765,897 A | | 8/1988 | Cadotte et al. |
| 4,888,116 A | | 12/1989 | Cadotte et al. |
| 4,950,404 A | | 8/1990 | Chau |
| 4,964,998 A | | 10/1990 | Cadotte et al. |
| 5,152,901 A | | 10/1992 | Hodgdon |
| 5,312,547 A | * | 5/1994 | Kruger et al. .................. 210/317 |
| 5,616,249 A | | 4/1997 | Hodgdon |
| 5,658,460 A | | 8/1997 | Cadotte et al. |
| 5,688,562 A | * | 11/1997 | Hsiung ....................... 427/434.3 |
| 5,755,964 A | | 5/1998 | Mickols |
| 5,876,602 A | | 3/1999 | Jons et al. |
| 5,919,370 A | * | 7/1999 | Rottger et al. ................ 210/646 |
| 6,024,873 A | | 2/2000 | Hirose et al. |
| 6,280,853 B1 | | 8/2001 | Mickols |
| 6,337,018 B1 | | 1/2002 | Mickols |
| 6,495,043 B1 | | 12/2002 | Heijnen |
| 6,616,982 B2 | | 9/2003 | Merrill et al. |
| 6,767,961 B1 | | 7/2004 | Wang et al. |
| 6,878,278 B2 | | 4/2005 | Mickols |
| 6,878,409 B2 | | 4/2005 | Kim et al. |
| 6,913,694 B2 | | 7/2005 | Koo et al. |
| 7,662,289 B2 | * | 2/2010 | Musale et al. ................ 210/636 |
| 2005/0077243 A1 | | 4/2005 | Pinnau et al. |
| 2005/0150383 A1 | | 7/2005 | Kang et al. |
| 2007/0039874 A1 | | 2/2007 | Kniajanski et al. |
| 2007/0175821 A1 | | 8/2007 | Koo et al. |
| 2007/0251883 A1 | | 11/2007 | Niu |
| 2007/0272607 A1 | * | 11/2007 | Kozlov et al. ............ 210/500.35 |
| 2009/0012208 A1 | * | 1/2009 | Madsen et al. ................ 523/113 |

FOREIGN PATENT DOCUMENTS

| | | | |
|---|---|---|---|
| EP | 0 220 660 A | | 5/1987 |
| EP | 0 421 676 A | | 4/1991 |
| EP | 1 552 875 A | | 7/2005 |
| WO | WO 93/05871 | | 4/1993 |
| WO | WO 2006/037321 | * | 4/2006 |
| WO | WO 2007/133362 | | 11/2007 |

OTHER PUBLICATIONS

Van Krevelen D. W. ED Properties of Polymers, Ed. 3, 1990, Elsevier, Amsterdam, p. 189-225.
WO 2008/097786 Search Report and Written Opinion.
U.S. Appl. No. 12/328,241, filed Dec. 4, 2008, Mickols, et al., co-pending with at least one common inventor.
U.S. Appl. No. 12/299,849, filed Apr. 12, 2007, Mickols, et al., co-pending with at least one common inventor.
Neil P. Desai et al., "Solution Technique to Incorporate Polyethylene Oxide and Other Water-Soluble Polymers into Surfaces of Polymeric Biomaterials", Biomaterials, 1991, vol. 12 March pp. 144-153.
Thomas Huber et al., "New Hyperbranched Poly(ether Amide)s Via Nucleophilic Ring Opening of 2-Oxazoline-Containing Monomers", Macromol. Chem. Phys. 200, No. 1, pp. 126-133, 1999.
John A. Frump, "Oxazolines, Their Preparation, Reactions, and Applications", Chemical Reviews, 1971, vol. 71, No. 5, pp. 483-505.
Guodong Kang et al., A Novel Method of Surface Modification on Thin-Film Composite Reverse Osmosis Membrane by Grafting Poly(ethylene Glycol), Polymer 48 (2007) pp. 1165-1170.
Yosang Yoon et al., "Polymer Electrolyte Membranes Containing Silver Ion for Facilitated Olefin Transport", Macromolecules, vol. 33, No. 9, May 2, 2000, pp. 3185-3186.
Sang Wook Kang et al., "Effect of Amino Acids in Polymer/Silver Salt Complex Membranes on Facilitated Olefin Transport", J. Membrane Science, 248 (2005) pp. 201-206.

* cited by examiner

*Primary Examiner* — Tony G Soohoo
*Assistant Examiner* — David C Mellon
(74) *Attorney, Agent, or Firm* — Edward W. Black

(57) ABSTRACT

A modified polyamide membrane and method for making and using the same. The present invention includes many embodiments including methods comprising contacting a polyamide membrane with certain modifiers, including but not limited to certain oxazoline and/or thiazoline-based compounds, derivatives and polymers thereof. In one embodiment, the surface of a polyamide membrane is coated with a solution including a polyoxazoline and optionally a polyalkylene oxide material, followed by optional heating. Preferred embodiments may exhibit improved performance, e.g. increased rejection of certain species, (e.g. sodium chloride and/or boric oxides such as boric acid or various borate salts), reduced fouling, improved antimicrobial properties, and/or improved storage stability.

23 Claims, No Drawings

MODIFIED POLYAMIDE MEMBRANE

CROSS REFERENCE TO RELATED APPLICATION

This application claims the benefit of U.S. Provisional application No. 60/899,451 filed 5 Feb. 2007, the entire content of which is incorporated herein by reference.

BACKGROUND OF THE INVENTION (1) Field of the Invention

The invention generally relates to polyamide membranes including methods for modifying such membranes by application of modifiers, including but not limited to certain oxazoline and/or thiazoline-based compounds, derivatives and polymers thereof.

(2) Description of the Related Art

Polyamide membranes have been used for decades to performing fluid separations. A classic example of such a membrane is FilmTec Corporation's FT-30™ membrane which comprises a microporous polysulfone sheet with a thin film polyamide layer. The polyamide layer is obtained by an interfacial polycondensation reaction between a polyfunctional amine monomer and a polyfunctional acyl halide monomer as described in U.S. Pat. Nos.: 4,277,344 and 5,658,460 to Cadotte et al. U.S. Pat. No. 6,878,278 to Mickols; U.S. Pat. No. 6,024,873 to Hirose and U.S. Pat. No. 4,950,404 to Chau. Methods of modifying such polyamide membranes are described in U.S. Pat. No. 5,876,602 to Jons et. al.; U.S. Pat. No. 5,755,964 and U.S. Pat. No. 6,280,853 to Mickols; U.S. Pat. No. 4,888,116; U.S. Pat. No. 4,765,897; U.S. Pat. No. 4,964,998 to Cadotte et. al.; US 2007/0251883 to Niu; U.S. Pat. No. 5,178,766 to Ikeda et al., and U.S. Pat. No. 6,913,694 and US 2007/0175821 to Koo et al. The entire content of each of the preceding references is fully incorporated herein. Still other methods for modifying a polyamide membrane are described in WO 2007/133362 to Mickols et al.

BRIEF SUMMARY OF THE INVENTION

The invention includes a modified polyamide membrane and method for making and using the same. The present invention includes many embodiments including methods comprising contacting a polyamide membrane with certain modifiers, including but not limited to certain oxazoline and/or thiazoline-based compounds, derivatives and polymers thereof. Preferred embodiments exhibit improved performance including increased rejection of certain species, e.g. sodium chloride and/or boric acid, reduced fouling, increased antimicrobial properties and/or improved storage stability. Many additional embodiments, objectives, advantages and features are disclosed.

DETAILED DESCRIPTION OF THE INVENTION

The invention is not particularly limited to a specific type, construction or shape of polyamide membrane or application. That is, the present invention is applicable to flat sheet, tubular and hollow fiber polyamide membranes used in a variety of applications including reverse osmosis (RO), nano filtration (NF), ultra filtration (UF), and micro filtration (MF) fluid separations. However, the invention is particularly useful for modifying composite polyamide membranes such as those previously described in the Background section. These types of composite membranes are commonly provided as a flat sheet comprising a microporous support and a "thin film" polyamide layer. Such composite polyamide membranes are most commonly used in spiral wound modules for RO and NF separations.

The polyamide membrane of the present disclosure can be prepared by interfacially polymerizing a polyfunctional amine monomer with a polyfunctional acyl halide, wherein each term is intended to refer both to the use of a single species or multiple species of amines in combination or acyl halides in combination, on at least one surface of a porous support. As used herein, "polyamide" is a polymer in which amide linkages (—C(O)NH—) occur along the molecular chain. The polyfunctional amine monomer and polyfunctional acyl halide can be delivered to the porous support by way of a coating step from solution, where the polyfunctional amine monomer can be coated from an aqueous solution and the polyfunctional acyl halide can be coated from an organic-based solution. Although the coating steps can be "non-sequential" (i.e., follow no specific order), the polyfunctional amine monomer is preferably coated on the porous support first followed by the polyfunctional acyl halide. Coating can be accomplished by spraying, film coating, rolling, or through the use of a dip tank, among other coating techniques. Excess solution can be removed from the support by air and/or water knife, dryers, or ovens, among others.

The polyfunctional amine monomer may have primary or secondary amino groups and may be aromatic (e.g., m-phenylenediamine, p-phenylenediamine, 1,3,5-triaminobenzene, 1,3,4-triaminobenzene, 3,5-diaminobenzoic acid, 2,4-diaminotoluene, 2,4-diaminoanisole, and xylylenediamine) or aliphatic (e.g., ethylenediamine, propylenediamine, and tris(2-diaminoethyl)amine). Examples of preferred polyfunctional amine monomers include primary amines having two or three amino groups, for example, m-phenylene diamine, and secondary aliphatic amines having two amino groups, for example, piperazine. The polyfunctional amine monomer can be applied to the porous support as an aqueous solution. The aqueous solution can contain from about 0.1 to about 20 weight percent and more preferably from about 0.5 to about 6 weight percent polyfunctional amine monomer. Once coated on the porous support, excess aqueous solution may be optionally removed.

The polyfunctional acyl halide is preferably coated from an organic-based solution including a non-polar solvent, although the polyfunctional acyl halide may be delivered from a vapor phase (e.g., for polyfunctional acyl halides having sufficient vapor pressure). The polyfunctional acyl halide is preferably aromatic in nature and contains at least two and preferably three acyl halide groups per molecule. Because of their lower cost and greater availability, chlorides are generally preferred over the corresponding bromides or iodides. One preferred polyfunctional acyl halide is trimesoyl chloride (TMC). The polyfunctional acyl halide can be dissolved in an organic solvent in a range from about 0.01 to 10 weight percent, preferably 0.05 to 3 weight percent, and delivered as part of a continuous coating operation. Suitable solvents are those which are capable of dissolving the polyfunctional acyl halide and which are immiscible with water, e.g. hexane, cyclohexane, heptane and halogenated hydrocarbons such as the FREON series. Preferred solvents include those which do not pose a threat to the ozone layer and yet are sufficiently safe in terms of their flashpoints and flammability to undergo routine processing without having to undertake extreme precautions. Higher boiling hydrocarbons, i.e., those with boiling points greater than about 90° C. such as hydrocarbons with eight to fourteen carbon atoms and mixtures thereof have more favorable flashpoints than hydrocarbons containing five to seven carbon atoms, but they are less volatile. A preferred organic solvent is ISOPAR™ available from Exxon Chemical Company.

Once brought into contact with one another, the polyfunctional acyl halide and the polyfunctional amine monomer react at their surface interface to form a polyamide membrane. In embodiments where the polyamide membrane is formed on a porous support, the polyamide membrane is often referred to as a polyamide "discriminating layer" or "thin film layer". As used herein, "polyamide membrane" can refer to a polyamide membrane and/or to a polyamide discriminating layer formed on a porous support.

The reaction time of the polyfunctional acyl halide and the polyfunctional amine monomer can be less than one second but contact time ranges from one to sixty seconds, after which excess liquid may optionally be removed, by way of an air knife, water bath(s), dryer, and the like. The removal of the excess water and/or organic solvent can be achieved by drying at elevated temperatures, for example, from about 40° C. to about 120° C., although air drying at ambient temperatures may be used.

The porous support can be a microporous support. In various embodiments, the microporous support can be a polymeric material containing pore sizes which are of sufficient size to permit the passage of permeate there through but not large enough so as to interfere with the bridging over of a thin polyamide membrane formed thereon. For example, the pore size of the support can range from 1 nm to 500 nm. Pore diameters larger than 500 nm, can, in some instances, permit the polyamide membrane to sag into the pores, thus disrupting the flat sheet configuration desired in some embodiments. Examples of porous supports include those made of a polysulfone, a polyether sulfone, a polyimide, a polyamide, a polyetherimide, polyacrylonitrile, a poly(methyl methacrylate), a polyethylene, a polypropylene, and various halogenated polymers, such as polyvinylidene fluoride. The porous support can also be made of other materials. In some embodiments, the porous support can have a thickness in a range of 25 μm to 125 μm.

The subject method generally comprises the step of contacting a polyamide membrane with a "modifier" as will be described below. The method may be integrated into the method of making the polyamide membrane, e.g. during the actual formation of the polyamide membrane itself; however, in preferred embodiments the subject method is practiced after the formation of the polyamide membrane. For example, in one embodiment the subject method is part of a continuous membrane manufacturing process and is implemented just after formation of the polyamide composite membrane; whereas in other embodiments the polyamide membrane may formed and stored prior to treatment via the subject method. The step of "contacting" is intended to broadly describe any means of bringing the modifier into contact with the polyamide membrane. Similarly, the term "applying" is intended to broadly describe a wide variety of means of bringing the modifier into contact with at least a surface portion of the polyamide membrane such as by way of spraying, air knifing, rolling, sponging, coating, dipping, brushing or any other known means. One preferred application technique is to apply a thin coating of the modifier over at least a portion of the outer surface of the polyamide membrane by way of a roll contact coater, sometimes referred to in the art as a "kiss" coater. The modifier is preferably delivered from an aqueous-based solution. The solution may comprise at least 0.001, preferably at least 0.01, and more preferably at least 0.1 weight percent of the modifier, and less than about 10 and more preferably less than about 1 weight percent of the modifier. The coating solution may also include other constituents including but not limited to co-solvents, additional modifiers (e.g. polyethylene glycol, polyvinyl alcohol, polyfunctional epoxy materials), along with residual "carry over" from previous manufacturing steps. The modifier coating preferable covers a substantial majority of the polyamide surface.

In an alternative embodiment the modifier may be applied to the polyamide membrane by adding the modifier to a feed liquid which is passed by (in contact with) the membrane, e.g. after the membrane has been assembled into a module. This alternative application technique is more suited to embodiments wherein the modifier is a polymer.

Once the modifier is contacted with at least a surface portion of the polyamide membrane, the resulting membrane is preferably heated, such as by way of a convection air dryer or oven; however other heating means may be used, e.g. IR heaters, lamps, etc. While not particularly limited, the temperatures of such dryers or ovens are preferably designed to optimize manufacturing conditions, e.g. line speed, membrane chemistry, etc. In several preferred embodiments, the heating step involves passing the polyamide membrane through an oven or convection air dryer at air temperatures of from about 60 to 120° C., and more preferably 85 to 100° C., for a few seconds (preferably about 10-60 seconds) up to several minutes (and much longer in some embodiments). As described below, the optional but preferred step of heating facilitates reaction of the modifier with the polyamide membrane and/or other materials present in some embodiments.

The steps of "applying" the modifier and/or "heating" may be conducted concurrently, but are preferably conducted sequentially. Moreover, the step of applying and/or heating may include a multiple cycles, e.g. coating followed by heating followed subsequent coating and heating. Furthermore, the step of heating may be utilized prior to the step of coating, particularly to remove residual fluids remaining after formation of the polyamide layer.

The modifiers of the present invention include oxazoline and/or thiazoline-based compounds, derivatives and polymers thereof. This class comprises materials that are preferably based upon an oxazoline and/or thiazoline ring, particularly 2-oxazoline and/or 2-thiazoline rings. Such rings may include a variety of substituents groups and may be polymerized to form macromonomers, copolymers or homopolymers—all collectively referred herein to as "polymers" unless otherwise specified.

In one embodiment, the modifier is selected from 2-oxazoline and/or 2-thiazoline compounds represented by Formula (I):

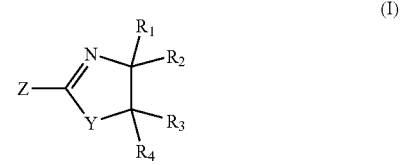

Y is selected from oxygen (oxazoline) and sulfur (thiazoline), but is preferably oxygen. $R_1$, $R_2$, $R_3$ and $R_4$ are not particularly limited. By way of example, $R_1$, $R_2$, $R_3$ and $R_4$ may be the same or different from one another and can be selected from such diverse groups as: hydrogen; halogen; aliphatic such as alkyl or alkenyl (including substituted aliphatic such hydroxylalkyl or hydroxylalkenyl; aryl (including substituted aryl include substituents such as hydroxyl, alkyl, halo or hydroxyl); amino; ester; hydroxyl; and polyalkylene oxide (e.g. polyethylene oxide, polypropylene oxide, etc.) preferably including an alcohol, ether, epoxide or polyalcohol such as ethylene glycol. In other preferred embodiments $R_1$, $R_2$, $R_3$ and $R_4$ are independently selected from hydrogen, aryl groups, and alkyl groups having from 1 to 4 carbon atoms (and more preferably 1 to 2 carbon atoms). In instances where one or more alkyl and/or aryl groups are included, it is preferred that at least two of $R_1$, $R_2$, $R_3$ and $R_4$ are hydrogen.

Z is not particularly limited but is preferably a "ring activating" group which allows the ring (oxazole or thiazole) of Formula I to open; and in preferred embodiments to polymerize. A preferred polymerization proceeds via cation ring opening and propagation (polymerization), as described below. The term "ring activating" group comprises those substituents that destabilize the cationic ring and enhance ring-opening reactivity, and subsequent propagation. While not wishing to be bound by theory, it is believed that the propagation step is the more critical in controlling the rate of polymerization. Thus, in preferred embodiments Z is selected from "propagating groups", i.e. groups that allow and preferably enhance propagation. It is further believed that electron withdrawing groups destabilize the cationic ring and enhance 1) ring-opening reactivity and 2) propagation; whereas electron donating groups tend to stabilize the ring and/or reduce the ring-opening reactivity. For purposes of oxazole, groups such as hydrogen, phenyls, alkyls, e.g. methyl, ethyl, etc. have sufficient electron effect to permit ring opening and propagation.

By way of example, a preferred catatonic initiated polymerization reaction scheme for oxazoline is illustrated below, wherein "MeOT" is methyl tosylate and "Me" is methyl. For this cationic ring-opening polymerization, the polymerization is governed by two main factors: the nucleophilicity of the monomer that results from the formation of 2-oxazoline salt(s) in Equation 1; and the ring-opening reactivity of the propagating oxazolinium species formed in Equations 2 and 3. As a whole, the polymerizability is governed by the reactivity of the propagating species.

Reaction Scheme 1: Cationic Ring Opening and Polymerization

Initiation:

(1)

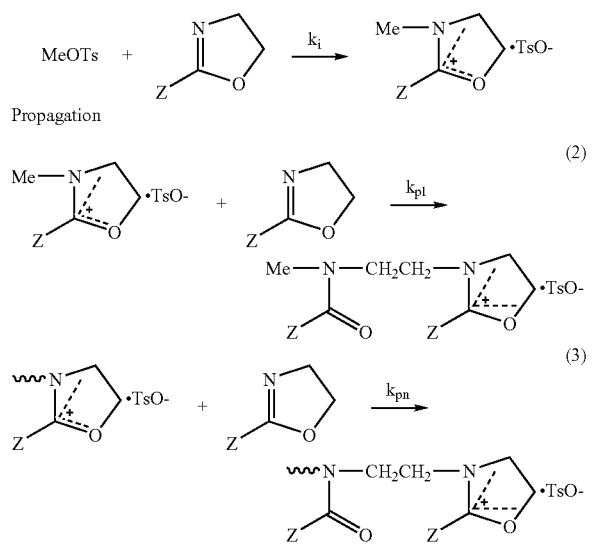

(2)

(3)

Such polymerization may occur after application of the modifier to the polyamide membrane or before, as will be described below in reference to the modifier of Formula II.

Applicable ring activating groups (Z groups) include: hydrogen; halogen; aliphatic such as alkyl (e.g. having 1 to 20 carbon atoms but preferably 1 to 4 carbon atoms) or alkenyl; substituted aliphatic such hydroxylalkyl or hydroxylalkenyl; aryl; substituted aryl include substituents such as hydroxyl, alkyl, halo or hydroxyl; amino; hydroxyl; and polyalkylene oxide (e.g. polyethylene oxide, polypropylene oxide) preferably including alcohol, ether, epoxide or poly alcohol such as ethylene glycol end groups; and having a molecular weight of less than about 2000 Daltons, preferably less than about 1000 Daltons, and more preferably less than about 600 Daltons. When used, the polyalkylene oxide group may be linear, branched, comb, brush, star or dendritic. In some embodiments wherein Z is a polyalkylene oxide group, a PEGilation process (described below) can be used to link the polyalkylene oxide to the modifier (e.g. via the no. 2 carbon of the original ring).

Other applicable Z groups includes those which provide an enhanced antimicrobial effect (i.e. result in the modified membrane having increase antimicrobial properties), such as: aniline, benzene-1,3-diamine, hydroxyl, quaternary ammonium and polybiocides.

Z may also include an internal linking group ("L") between the aforementioned groups and the no. 2 carbon of the original ring. The linking group is not particularly limited and serves as covalent linkage between the aforementioned Z groups and the no. 2 carbon of the original ring, as illustrated in Formula (I-A), wherein Z' is that same as the aforementioned Z groups.

(I-A):

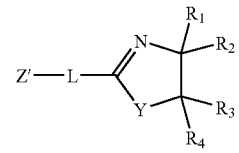

Examples of applicable linking groups include: alkyl, phenyl, ester, ketone, ether, oxygen, sulfide, urethane, beta hydroxy amine, amide, amine, phosphate, sulfone, and thiol, and metals including iron, lead, antimony and phosphorus.

In order to improve coatability, Z is preferably selected from groups that provide or otherwise result in the modifier having a solubility parameter greater than about 18 $J^{1/2}cm^{-3/2}$, preferably greater than or equal to 20 $J^{1/2}cm^{-3/2}$, more preferably greater than or equal to 22 $J^{1/2}cm^{-3/2}$, and in some embodiments greater than or equal to 24 $J^{1/2}cm^{-3/2}$; and less than or equal to about 49 $J^{1/2}cm^{-3/2}$. If Z is selected from substituents that result in a modifier having a solubility parameter less than 18, the modifier becomes increasingly difficult to coat on the polyamide membrane—particularly from aqueous-based coating solutions. Solubility parameters are widely used and reported in the literature. Solubility parameters may be determined experimentally but are often based upon calculated values or estimates based upon experimentally determined values of similar materials. The use of solubility parameters dates back to the early work of Hildebrand using cohesive energy densities, i.e. the square root of the cohesive energy of a material divided by its molar volume. Solubility parameters are commonly calculated using a series of approximations of basic physical parameters. An updated approach is described in D. W. Van Krevelen, "Properties of Polymers, Their correlation with chemical structure: their numerical estimation and predictions from additive group contributions," 3rd Ed., Elsevier, N.Y., (1990).

In preferred embodiments, Z is selected from groups that result in the modifier being soluble (i.e. "solubilizing group") in aqueous-based solutions comprising at least 50 weight percent water, preferably at least 75 weight percent water, more preferably at least 90 weight percent water, and still more preferably at least 98 weight percent water. Such aqueous-based solutions may include other components including alcohols such as: methanol, ethanol, propanol, isopropanol, hexanol, etc; surfactants, and/or other additives. In most embodiments, preferred solubilizing groups include: hydrogen, aryl group, or alkyl group having from 1 to 20 but preferably 1-4 carbon atoms and polyalkylene oxide groups. Those skilled in the art will appreciate that the total molecular weight of the modifier, the chemical nature of the modifier's terminal end cap groups, and the presence of any co-monomer units will impact the solubility of the modifier, and that the solubility of any given modifier in aqueous-based solutions can be determined via routine experimentation.

The selection of Y, Z, $R_1$, $R_2$, $R_3$ and $R_4$ are independent of each other. In some preferred embodiments, $R_1$, $R_2$, $R_3$ and $R_4$ are each hydrogen, Y is oxygen and Z is a hydrogen, aryl group, or alkyl group having from 1 to 20 but preferably 1-4 carbon atoms, such as 2-ethyl oxazoline. In yet another preferred set of embodiments, $R_1$, $R_2$, $R_3$ and $R_4$ are each hydrogen, Y is oxygen and Z is a polyalkylene oxide group (e.g. polyethylene oxide, polypropylene oxide, etc.). The polyalkylene oxide group preferably has less than about 60 and more preferably less than 30, and still more preferably less than 20 repeating units of alkylene oxide and preferably comprises a hydroxyl, epoxide or ethylene glycol end group.

The phrase "the same or different" as used herein is intended to mean that individual groups, e.g. Z, $R_1$, $R_2$, etc. are selected independently from one another, i.e. within an individual compound, within a repeating unit, and/or between separate compounds or polymers.

In another embodiment of the invention, the modifier is a polymer comprising a repeating unit represented by Formula (II).

(II):

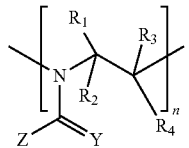

wherein $R_1$, $R_2$, $R_3$, $R_4$, Y and Z are as defined with reference to Formula I and n is an integer between 2 and about 50,000, preferably from about 50 to about 10,000. Z is preferably selected from groups that provide or otherwise result in the modifier having a solubility parameter greater than or equal to about 18 $J^{1/2}cm^{-3/2}$, preferably greater than or equal to 20 $J^{1/2}cm^{-3/2}$, more preferably greater than or equal to 22 $J^{1/2}cm^{-3/2}$, and in some embodiments greater than or equal to 24 $J^{1/2}cm^{-3/2}$; and less than or equal about 49 $J^{1/2}cm^{-3/2}$. In some embodiments, Z is a solubilizing group as previously described. In some preferred embodiments, $R_1$, $R_2$, $R_3$ and R are each hydrogen, Y is oxygen and Z is a hydrogen, aryl group, an alkyl group having from 1 to 20 but preferably 1-4 carbon atom, or a polyalkylene oxide group (e.g. polyethylene oxide, polypropylene oxide) preferably including an end cap group selected from: alcohol, ether, epoxide or poly alcohol such as ethylene glycol end groups.

The terminal portions of the polymer (i.e. failing outside the bracketed portion of Formula II) are not particularly limited and preferably comprise less than about 50 weight percent of the polymer, more preferably less than about 10 weight percent, still more preferably less than about 5 weight percent, still more preferably less than about 2 weight percent, and in some embodiments less than about 1 weight percent of the total weight of the polymer. In some embodiments, the terminal portion of the polymer may be non-reactive, or simply the residual portion of the polymerization, (e.g. alkyl and/or hydroxyl). However, in many embodiments the terminal portions include groups that are chemically reactive with chemical moieties of the polyamide membrane, e.g. form covalent or hydrogen bonds therewith. Examples of such groups include: alcohol, oxazoline, thiol, tolyl, amine, azide, carboxy, styrl, (meth)acrylate, alkenyl, and groups including vinyl groups, and particularly epoxide, ethylene glycol, and hydroxyl. By way of example, reference is made to Formula (II-A):

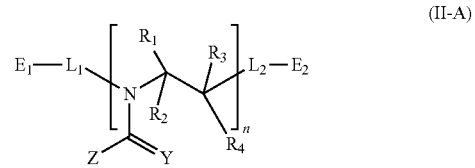

wherein $E_1$ and $E_2$ are terminal end cap groups and $L_1$ and $L_2$ are linking groups. $E_1$ and $E_2$ may be the same or different, but $E_1$ is commonly selected from: hydrogen, alkyl, p-styrlalkyl, m-styrlalkyl, p-aminobenzyl, m-aminobenzyl, 1-3-diaminobenzyl, acrylalkyl and methacrylalkyl, vinylalkyl, vinylester, vinylether, and polyalkylene glycol groups. $E_2$ is commonly selected from hydroxyl, halo, amino, alkylamino, dialkylamino, trialkylamino, diethanolamino, p-styrlalkylamino, m-styrylalkylamino, methacrylate, acrylate, acrylalkylamino, methacrylalkylamino, vinylalkylamino, vinylesteramino, vinyletheramino, and poly(alkylene oxide) amino groups. In preferred embodiments, at least one of the end caps is selected from a reactive group such as epoxy, ethylene glycol and hydroxyl, but preferably epoxy. $E_1$ can be chosen based on the selection of ring-opening initiators. In addition, the functionality of $E_2$ can be introduced by the living nature of a 2-oxazoline polymerization where the living cationic propagating species of 2-oxazolines is terminated (end-capped) with a nucleophilic agent such as an amine containing group. Also, $E_1$ and $E_2$ may contain various polymerizable vinyl groups.

Linking groups $L_1$ and $L_2$ are not particularly limited and serve to provide a covalent link to the end cap groups. In addition to serving this function, they may also be selected to modify the solubility, hydrophilicity and/or hydrogen bonding capacity of the polymer. For example, one or both of $L_1$ and $L_2$ may be a simple covalent bond to the terminal end cap group, or an aliphatic group, alkyl phenyl ester, ether, sulfide, urethane, amide, amine, metal, phosphate, polyalkylene oxide group, or polyvinyl alcohol group linking to the terminal end cap group. Preferred linking groups include an ether group and alkyl groups having from 1 to 12 carbon atoms.

As the combined molecular weight of the linking and end cap groups approaches 10 weight percent of the total polymer, the resulting polymer can be better described as block copolymer wherein the term "block" refers to a segment of reoccurring repeating units. In preferred embodiments, a linking group or block preferably comprise equal to or less than 10 weight percent of the polymer, more preferably equal to or less than 5 weight percent, still more preferably equal to or less than 2 weight percent, and in some embodiments equal to or less than 1 weight percent of the polymer. For example, in embodiments where at least one of the linking groups comprises polyalkylene oxide, the number of repeating alkylene oxide units is preferably less than about 60, more preferably less than 30, and still more preferably less than 20.

The terms "polyalkylene oxide group" or "polyalkylene oxide material" are intended to describe polymers or groups having at least two repeating units comprising an ether-alkyl group wherein the alkyl group forming the backbone of the repeating unit comprises from 2 to 3 carbon atoms which can be substituted. Common substituents groups including alkyl, hydroxyl, hydroxylalkyl, and alkyl groups linked via an epoxy linking group. Specific examples include ethylene oxide and propylene oxide repeating units. By way of illustration, preferred embodiments of polyalkylene oxide groups and materials can be represented by the repeating unit shown in Formula (III):

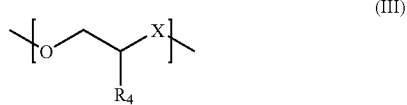
(III)

wherein X is a carbon atom or a chemical bond (e.g. the repeating unit only comprises two carbon atoms); and $R_4$ is not particularly limited but is preferably selected from hydrogen, alkyl group (preferably having 1-4 carbon atoms but more preferably 1 carbon atom), hydroxyl group, and a hydroxylalkyl group having from 1 to 4 carbon atoms. Preferred examples are illustrated in Formulae III-A through III-D.

(III-A):
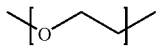

(III-B):
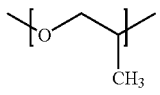

(III-C):
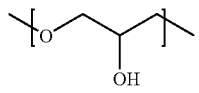

(III-D):
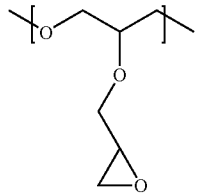

Additional examples of preferred polyalkylene oxide groups and materials are those described in U.S. Pat. No. 6,280,853 (incorporated in its entirety). These materials include the repeating unit of Formula III with a terminal portion selected from non-acrylate electrophilic groups reactive with the functional groups present on the surface of the polyamide membrane. Specific examples include groups comprising: succinimidyl esters, succinimidyl amides, succinimidylimides, oxycarbonyldimidazoles, azides, epoxides, aldehydes, tresylates, isocyanates, sulfones (e.g. vinyl sulfone), nitropheyl carbonates, trichlorophenyl carbonates, benzotriazole carbonates, glycidyl ethers, silanes, anyydrides, amines, hydroxyl and thiols.

The polyalkylene oxide end cap or block preferably includes a terminal end group selected from alcohol, ether, epoxide or poly alcohol such as ethylene glycol. The polyalkylene oxide end cap or block may be linear, branched, comb, brush, star or dendritic.

In still other embodiments, the terminal portions of the polymer may be selected from groups which provide an enhanced antimicrobial effect (i.e. result in the modified membrane having increase antimicrobial properties), such as: aniline, benzene-1,3-diamine, hydroxyl, quaternary ammonium and polybiocides.

In addition to the repeating units of Formula II (and in some embodiments repeating units of Formula III), the subject polymer may include additional (different type) repeating units (i.e. copolymerized with other type monomers). However, when included, such co-monomers contribute to less than about 10 weight percent, more preferably less than about 5 weight percent, still more preferably less than about 2 weight percent, and in some embodiments less than about 1 weight percent of the subject modifier polymer. The subject polymer preferably comprises equal to or more than 50 weight percent, more preferably equal to or more than 90 weight percent, still more preferably equal to or more than 95 weight percent, still more preferably equal to or more than 98 weight percent and in some embodiments equal to or more than 99 weight percent of the repeating units represented by Formula (II).

The subject polymer may also include the reaction product(s) of polymers described with reference Formula II with other materials such as the polyalkylene oxide materials described with reference to Formula III, or as described in U.S. Pat. No. 6,280,853 (incorporated herein in its entirety), and/or polyfunctional epoxy materials as described in U.S. Pat. No. 6,913,694 (incorporated herein in it entirety). Such polyfunctional epoxy materials include the reaction products of epichlorohydrin and a polyfunctional hydroxy, amino and/or amide compound such as: ethylene glycol, 1,3, propanediol, glycerol, tris(hydroxymethyl) aminomethane, sorbitol, hydroquinon, bisphenol, polyvinyl alcohol, polyvinyl phenol, polyacrylamide, cellulose and its derivatives, chitosan, etc.

The reaction products of polymers described with reference to Formula II with other materials described above may include the chemical modification of the terminal portion of a polymer represented by Formula II with a linking group and end cap group as previously described (with respect to the repeating units of Formula III). Alternatively, or additionally the reaction products may include hydrogen bonding and/or entanglement between polymers having repeating units of Formula II and other polymers such as the aforementioned polyfunctional epoxide materials and the polyalkylene oxide materials described with reference to Formula III. Such reaction products may include blends of polymers. For example, the subject invention includes the use of blends of polyoxazolines with polyalkylene oxides such as poly(ethylene oxide) diglycidyl ether (PEGDE), and/or polyglycerin-polyglycidylether materials such as DENACOL 512 available from Nagase Chemtex Corp. Such blends may include additional polymers such as poly(vinyl alcohol). Such blends may be formed prior to coating, or may be formed as a result of sequential coating on the polyamide membrane.

In addition, in some embodiments, the invention includes contacting the polyamide membrane with an emulsion or microemulsion including an internal phase of a reaction product of a block poly(2-oxazoline) macromonomer with one or more of styrene, divinylbenzene, 1,3-diisopropenylbenzene, polyethylene glycol methyl ether acrylate, polyethylene glycol methyl ether methacrylate, methacrylate, acrylate, vinylacetate, N-vinylformamide, and N-vinylpyrrolidone. Such embodiments may include a surfactant.

The subject modifier polymers can be made by a variety of known methods. The preparation, reaction and applications of oxazolines and polyoxazolines are well known, as described in "Oxazolines: Their Preparation, Reactions, and Applications" by John A. Frump, Chemical Reviews, Vol. 71, No. 5, 483-505 (1971). See also, Huber et. al. "New hyperbranched poly(ether amide)s via nucleophilic ring opening of 2-oxazoline-containing monomers" Macromolecular Chemical Physics, Vol. 200, 126-133 (1999).

One preferred method includes a cationic ring polymerization of 2-oxazolines. By way of example, linear poly(2-ethyl-2-oxazoline) and branched poly(2-ethyl-2-oxazoline) can be prepared by the cationic ring-opening polymerization of 2-ethyl-2-oxazoline, shown in Reaction Scheme 2.

Reaction Scheme 2:

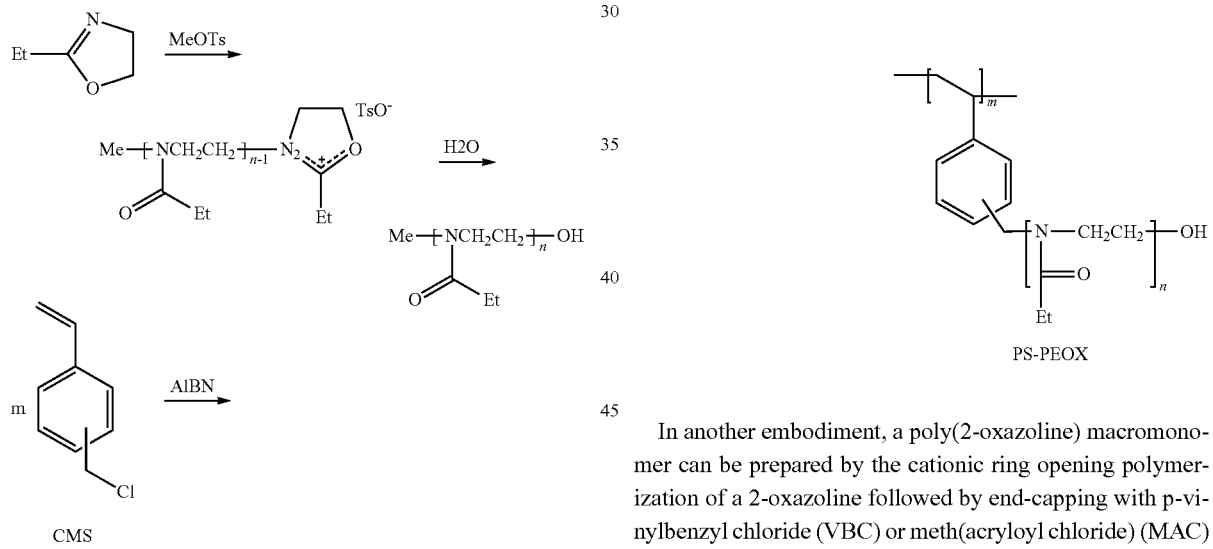

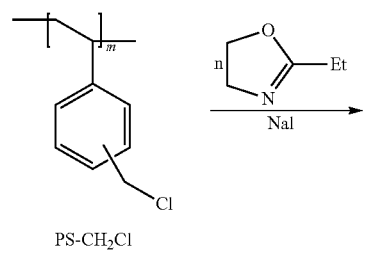

PS-CH$_2$Cl

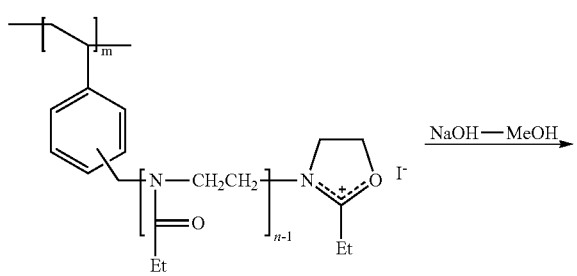

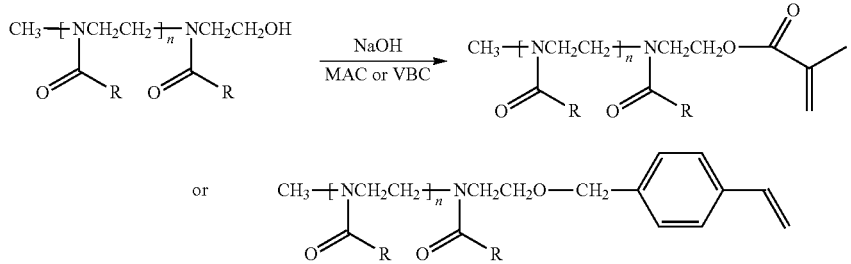

PS-PEOX

In another embodiment, a poly(2-oxazoline) macromonomer can be prepared by the cationic ring opening polymerization of a 2-oxazoline followed by end-capping with p-vinylbenzyl chloride (VBC) or meth(acryloyl chloride) (MAC) as shown in Reaction Scheme 3.

Reaction Scheme 3:

wherein "R" is the same "Z" previously defined.

Yet another poly(2-oxazoline) macromonomer can be prepared by a ring-opening polymerization of 2-alkyl-2-oxazoline under argon or nitrogen using a mixture of chloromethylstyrene and sodium iodide as an initiator, as shown in Reaction Scheme 4.

Reaction Scheme 4:

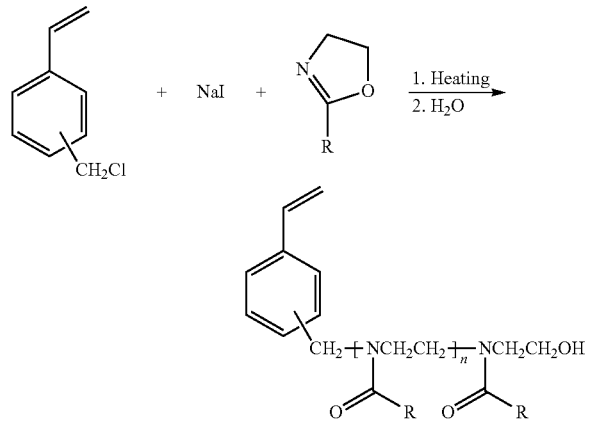

wherein "R" is the same as "Z" previously described.

Additionally, a two-stage cationic ring-opening polymerization of 2-oxazolines can also be used with different Z groups to make block poly(2-oxazoline) and poly(2-oxazoline) macromonomers. Block poly(2-oxazoline) and poly(2-oxazoline) macromonomers can have a structure represented by Formula (IV):

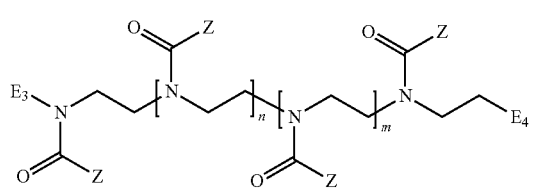

Z is the same or different and is as previously defined with respect to Formula I. In a preferred embodiment, Z may be independently selected from: H, an alkyl having from 1 to 20 carbon atoms (more preferably from 1 to 4 carbon atoms), phenyl, and substituted phenyl groups. $E_3$ is selected from H, alkyl, p-styrlalkyl, m-styrlalkyl, p-aminobenzyl, m-aminbenzyl, 1-3-diaminobenzyl, acrylalkyl and methacrylalkyl, vinylalkyl, vinylester, vinlyether, and polyalkylene glycol groups. $E_4$ is selected from hydroxyl, halo, amino, alkylamino, dialkylamino, trialkylamino, diethanolamino, p-styrlalkylamino, m-styrylalkylamino, methacrylate, acrylate, acrylalkylamino, methacrylalkylamino, vinylalkylamino, vinylesteramino, vinyletheramino, and poly(alkylene oxide) amino groups.

In some embodiments, $E_3$ can be chosen based on the selection of ring-opening initiators. In addition, the functionality of $E_4$ can be introduced by the living nature of a 2-oxazoline polymerization where the living cationic propagating species of 2-oxazolines is terminated (end-capped) with a nucleophilic agent such as an amine containing group. Also, $E_3$ and $E_4$ can contain various polymerizable vinyl groups. In some embodiments, Z can denote a hydrophilic polymer block, hydrophobic polymer block, or combinations within the materials of Formula (IV). Z can also represent part of an oxazoline monomer, which can provide for desired surfactant properties for emulsion polymerization with other co-monomers.

In some embodiments, the method of modifying the polyamide membrane can include reacting a poly(2-oxazoline) macromonomer or block macromonomer, as shown and discussed herein, with itself or with one or more of styrene, methacrylate, acrylate, polyethylene glycol methyl ether acrylate, polyethylene glycol methyl ether methacrylate, vinylacetate, N-vinylformamide, and N-vinylpyrrolidone to form branch, block, graft, brush, and comb polymers. The method can also include contacting the polyamide membrane with the branch, block, graft, brush, and comb polymers.

In addition, in some embodiments, the method can include contacting the polyamide membrane with an emulsion or microemulsion including an internal phase of a reaction product of a poly(2-oxazoline) macromonomer or block macromonomer with one or more of styrene, divinylbenzene, 1,3-diisopropenylbenzene, polyethylene glycol methyl ether acrylate, polyethylene glycol methyl ether methacrylate, methacrylate, acrylate, vinylacetate, N-vinylformamide, and N-vinylpyrrolidone. Such embodiments may include a surfactant. The subject polymer preferably comprises equal to or more than 50 weight percent, more preferably equal to or more than 90 weight percent, still more preferably equal to or more than 95 weight percent, still more preferably equal to or more than 98 weight percent and in some embodiments equal to or more than 99 weight percent of the repeating units represented by Formula (II).

In some embodiments the compound represented by Formulae (I) and/or (II) can be modified by a PEGilation process. As used herein, "PEGilated" or "PEGilation" refers to the process of covalently coupling a poly(alkylene oxide), e.g. poly(ethylene oxide) structure to another larger molecule. The term "PEGilation" is partially based upon a class of polyethylene oxide polymers having glycol end caps, i.e. polyethylene glycol, or "PEG". However, for purposes of the subject invention, the term "PEGilation" refers more broadly to the use of poly(alkylene oxides), independently of whether such polymers including glycol end caps.

In various embodiments, when the polyamide membrane is modified by an oxazoline-based modifying material selected from 2-oxazolines and derivatives of 2-oxazolines, such oxazoline-based modifying material can be PEGilated by reacting with a poly(alkylene oxide)-containing compound to create an oxazoline ended poly(alkylene oxide) macromonomer, as shown in Reaction Schemes 5, 6 and 7.

Reaction Scheme 5:

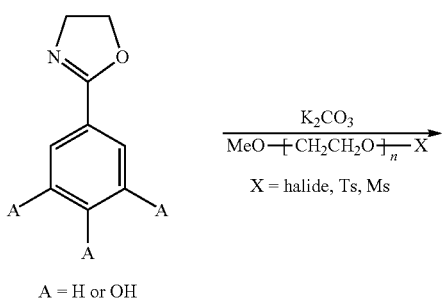

A = H or OH

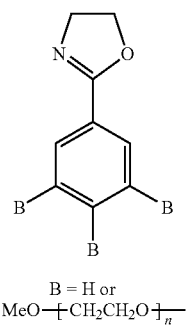

B = H or
MeO—(CH₂CH₂O)ₙ—

Reaction Scheme 6:

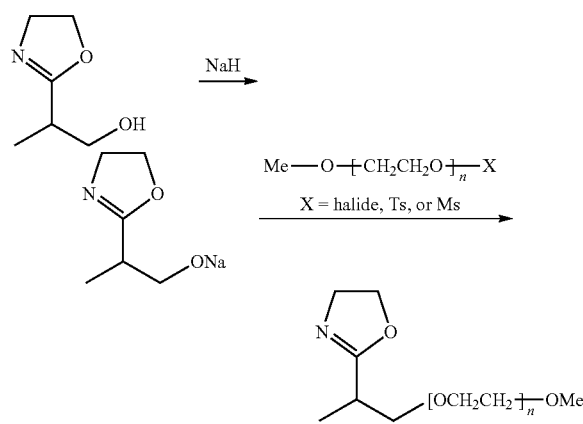

Reaction Scheme 7:

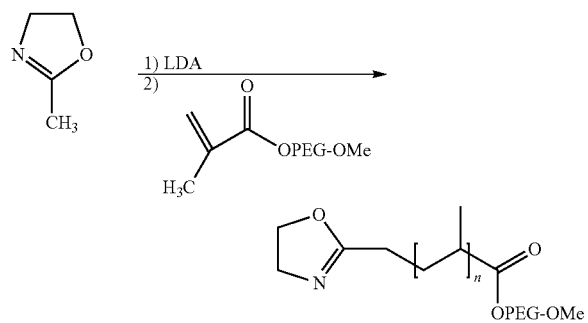

wherein "R" is the same as "Z" as previously described, and "PEG" refers to a ethylene oxide repeating unit.

As illustrated in Reaction Schemes 5, 6, and 7, the 2-oxazolines and derivatives of 2-oxazolines can be, for example, a derivative of 2-phenyl-2-oxazoline, 2-(4,5-dihydrooxazol-2-yl) propan-1-ol, and/or a 2-methyl-2-oxazoline and the poly(ethylene oxide) containing compound can be MeO—[—CH₂CH₂O—]—X, where X is a halide, tosyl (Ts), or methanesulfonyl (Ms).

Furthermore, macromonomers such as those shown in Reaction Schemes 5, 6 and 7 can be polymerized in cationic ring-opening fashion as shown in Reaction Scheme 1 to make poly(2-oxazoline) with pendent poly(ethylene oxide) side chains.

In some embodiments, a mixture of two or more 2-oxazolines can be PEGilated using monomethoxy-PEG-tosylate as a macroinitiator to form copolymers of the two or more 2-oxazolines.

The PEGilation process can include reacting the 2-oxazolines and derivatives of 2-oxazolines with a poly(ethylene oxide) containing compound selected from a group including: monomethoxy-poly(ethylene oxide)-tosylate and PEG-bis(tosylate) to an oxazoline-based modifying material selected from: a diblock poly(2-oxazoline)-poly(ethylene glycol) copolymer and/or a triblock poly(2-oxazoline)-poly(ethylene glycol) copolymers. The diblock and triblock copolymers can be formed, for example, as illustrated in Reaction Schemes 8 and 9.

Reaction Scheme 8:

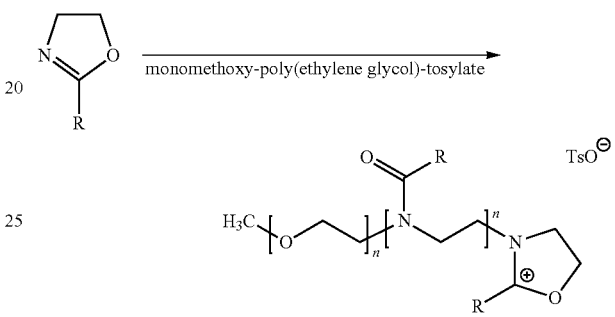

wherein "R" is the same as "Z" as previously described.

Reaction Scheme 9:

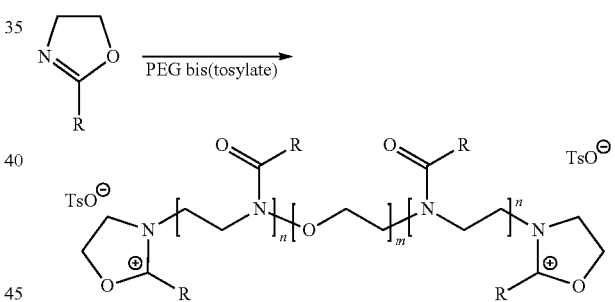

wherein R is the same as "Z" as previously described.

A preferred genus of the polymers of the subject invention comprise "poly(oxazolines)," wherein the term "poly(oxazolines)" includes polymers derived from oxazoline compounds (include substituted oxazolines), i.e. polymers having repeating units based upon oxazoline. Preferred polymers have a molecular weight greater than or equal to about 1000 Daltons, preferably greater than or equal to about 5000 Daltons and more preferably greater than or equal to about 50,000 Daltons; and less than about 2,000,000 Daltons, preferably less than about 1,000,000 Daltons and more preferably less than about 600,000 Daltons. A preferred class of modifiers comprises poly(2-oxazolines), including poly(2-alkyl-oxazolines) wherein the alkyl group comprises from 1 to 20 carbon atoms, and more preferably 1 to 4 carbon atoms. An addition preferred class of polymers include the reaction product(s) of the aforementioned poly(oxazolines), (preferably poly(2-oxazolines)); and the aforementioned polyfunctional epoxy materials and/or poly(alkylene oxide) materials preferably having molecular weights less than about 2000 Daltons, and more preferably less than about 1000 Daltons. A preferred polyalkylene oxide material comprises poly(ethylene oxide) diglycidyl ether (PEGDE), and/or polyglycerin-polyglycidylether materials such as DENACOL 512 available from Nagase Chemtex Corp. The poly(oxazolines) and other optional polymers or materials may be reacted and subsequently coated, combined and coated upon the polyamide membrane from a common aqueous solution, or sequentially coated. Additional solvents, reactants, and/or other polymers (e.g. approx. 1 wt % poly(vinyl alcohol) may also be included in the coating solution(s). The coating solution preferably comprises at least 0.001, preferably at least 0.01, and more preferably at least 0.1 weight percent of the subject modifier, and less than about 10 and more preferably less than about 1 weight percent of the modifier. Once coated, the polyamide membranes are preferably heated at a temperature of from about 60 to about 120° C. for more than about 1 second, more preferably more than about 10 seconds. The heating step may be performed by passing the coated membrane through a heated air dryer as part of a continuous operation.

The polyamide membranes of the subject invention may also include hygroscopic polymers upon at least a portion of its surface. Such polymers include polymeric surfactants, polyvinyl alcohol and polyacrylic acid. In some embodiments, such polymers may be blended and/or reacted with the subject modifiers, and may be coated or otherwise applied to the polyamide membrane from a common solution, or applied sequentially.

While not wishing to be bound by theory, it is believed that the subject modifiers become bound to the polyamide membrane via the subject method. For example, in embodiments were the modifier includes reactive end groups, (including a reactive Z group) such as a hydroxyl, epoxide, isocyanates, azides, or tresolates, such groups are believed to form covalent bonds with unreacted amines and/or carboxylic acids groups of the polyamide membrane. The optional step of heating a membrane after coated with the subject modifiers is believed to facilitate a reaction with the polyamide membrane. Such heating is also believed to remove residual water and lead to hydrogen bonding between the modifier and the polyamide membrane. In other embodiments, the step of heating the coated membrane may lead to chemical reaction between the modifier species of Formula (I) and/or (II) to with polymers represented by Formula (III) or polyfunctional epoxy materials, thus forming block copolymers which can be bound with the polyamide membrane as previously described. As an additional or alternative binding mechanism, preferred embodiments of the modifiers are believed to physically entangle with and/or interpenetrate the polyamide material of the membrane, e.g. via long chains of poly(alkylene oxide) and/or poly(2-oxazonline) becoming physically entangled with each other and with the polyamide material of the membrane.

EXAMPLES

Several example membranes were prepared and then coated with the subject modifiers. The "uncoated" composite polyamide membranes used in the examples were based upon classic FT-30 type composite membranes, i.e. produced by coating a microporous polysulfone support (including a non-woven fabric backing) with an aqueous solution of meta-phenylenediamine (MPD) and trimesoyl chloride (TMC). The present invention is not limited to FT-30 type composite membranes, nor is the invention limited to specific polyamide chemistries. For example, polyamide chemistries are typically optimized for specific applications such as RO desalination, RO brackish water, and NF. While such membranes may all be based upon FT-30 chemistries (e.g. MPD & TMC interfacial polymerization), the amounts and ratios of constituents typically varies in order to optimize performance for a particular application. Moreover, additives (as described in U.S. Pat. No. 6,878,278) are often utilized to further optimize or customize performance of the underlying polyamide membrane for a specific application. While the specific chemistry involved in the formation of the polyamide membrane will impact final membrane performance, (e.g. flux, NaCl passage, etc.), the following examples are intended to demonstrate relative improvement resulting from the subject coating which is largely independent of the underlying polyamide formation.

The example composite polyamide membranes were prepared by coating a microporous polysulfone support with an aqueous solution of MPD (approximate MPD concentration of 5.9 wt %). The resulting support was then drained to remove the excess aqueous solution. The support was subsequently coated with a solution of trimesoyl chloride (TMC) in ISOPAR™ L (Exxon Corp.) (approximate TMC concentration of 0.16 wt %) to produce a "thin film" polyamide layer upon the microporous support. After formation of the polyamide layer, the composite membranes were passed through a water bath at room temperature followed by a subsequent water bath containing 3.5 wt % glycerin at approximately 100° C. The membranes were then passed through a convection air dryer at approximately 65° C. for approximately 50 seconds followed by coating via a contact coater with an aqueous solution of poly(2-ethyl-2-oxazoline) (PEOX) (MW 500,000) "AQUAZOL" obtained from Polymer Chemistry Innovation, Inc. Phoenix, Ariz., or PEOX with poly(ethylene oxide) diglycidyl ether (PEGDE) (MW 526) obtained from Sigma-Aldrich Company. Coatings were performed at various modifier concentrations as specified in Table 1. The coated membranes were subsequently passed through a second convection air dryer at approximately 65° C. for approximately 50 seconds resulting in a thin coating on the surface of the polyamide layer of the composite membrane. The membranes were tested using a transmembrane pressure of 800 psi (approx. 5,520,000 Pascals) and an aqueous test solution comprising approximately 32,000 ppm NaCl and approximately 28.6 ppm boric acid maintained at a pH of approximately 8. The membranes where then stored in a dry state for approximately ten days and re-tested under the same conditions. The results of the testing are provided in Table 1.

TABLE 1

| Coating Solution (wt % modifier) | Flux (gfd) | NaCl Passage (%) | Boric Acid Passage (%) | *Flux (gfd) | *NaCl Passage (%) | *Boron Passage (%) |
|---|---|---|---|---|---|---|
| 0.05% PEOX | 27.0 ± 0.8 | 0.31 ± 0.05 | 5.55 ± 0.16 | 29.9 ± 0.4 | 0.28 ± 0.04 | 6.13 ± 0.16 |
| 0.10% PEOX | 25.9 ± 0.1 | 0.25 ± 0.01 | 5.30 ± 0.09 | 28.1 ± 0.5 | 0.24 ± 0.01 | 5.76 ± 0.19 |
| 0.15% PEOX | 25.6 ± 0.4 | 0.26 ± 0.08 | 5.20 ± 0.13 | 28.2 ± 0.1 | 0.22 ± 0.01 | 5.55 ± 0.32 |
| 0.20% PEOX | 25.6 ± 0.5 | 0.22 ± 0.02 | 5.21 ± 0.14 | 28.2 ± 1.2 | 0.24 ± 0.02 | 5.78 ± 0.25 |
| 0.1% PEOX/ 0.05% PEGDE | 20.3 ± 0.5 | 0.20 ± 0.10 | 3.97 ± 0.10 | 22.7 ± 0.4 | 0.16 ± 0.01 | 4.37 ± 0.22 |

TABLE 1-continued

| Coating Solution (wt % modifier) | Flux (gfd) | NaCl Passage (%) | Boric Acid Passage (%) | *Flux (gfd) | *NaCl Passage (%) | *Boron Passage (%) |
|---|---|---|---|---|---|---|
| 0.1% PEOX/ 0.1% PEGDE | 17.5 ± 0.2 | 0.18 ± 0.02 | 3.61 ± 0.15 | 19.7 ± 1.2 | 0.19 ± 0.07 | 4.04 ± 0.26 |
| Control (no coating) | 32.8 ± 1.5 | 0.61 ± 0.07 | No data collected | 33.9 ± 1.2 | 0.82 ± 0.09 | No data collected |

*Re-tested after dry storage for approximately ten days

In addition to reducing the passage of certain species (e.g. NaCl, Boron), preferred embodiments of the invention may also exhibit improved storage stability. Composite polyamide membranes are commonly assembled and stored in a dry state. Upon re-wetting, such membranes often have noticeable changes in flux and solute (e.g. NaCl) passage performance. For example, the NaCl passage of the control membrane changed from 0.61% to 0.82% after about 10 days in dry storage. In sharp contrast, the NaCl passage of the experimental membranes coated with the subject coatings remained relatively unchanged.

Additional examples were prepared, coated and tested in a similar manner but with PEOX coatings having different molecular weights, ranging from about 50,000 to 500,000 Daltons. The molecular weight of the PEOX had little impact on NaCl passage and flux of the resulting membranes.

While not limited to a particular type of membrane, the subject invention is particularly suited for application to composite polyamide membranes such as those commonly used in RO and NF applications. Such membranes include a microporous support and a thin film polyamide layer which can be coated with the subject modifier(s).

While principles of the invention are amenable to various modifications and alternatives forms, particular species have been described by way of examples, drawings and detailed description. It should be understood that the intent of this description is not to limit the invention to the particular embodiments described, but rather to cover all modifications, equivalents, and alternatives falling within the spirit and scope of the disclosure.

The invention claimed is:

1. A method of modifying a reverse osmosis or nano filtration polyamide membrane comprising the step of contacting the polyamide membrane with a material comprising a reaction product of poly(oxazoline) and at least one of: i) a poly(alkylene oxide) material and ii) a polyfunctional epoxide material.

2. The method of claim 1 comprising the step of applying a solution comprising the material of claim 1 to at least a surface portion of the polyamide membrane.

3. The method of claim 2 comprising the step of heating the polyamide membrane after the application of solution.

4. The method of claim 1 wherein the material comprises poly(2-ethyl-2-oxazoline).

5. The method of claim 1 comprising the step of contacting the polyamide membrane with a polyalkylene oxide material.

6. The method of claim 1 wherein the polyamide membrane is coated with an aqueous-based solution comprising a poly(oxazoline) and a polyalkylene oxide material.

7. The method of claim 1 wherein the polyamide membrane is contacted with a reaction product of a poly(oxazoline) and a polyalkylene oxide material.

8. The method of claim 1 wherein the polyamide membrane is contacted with a reaction product of a poly(oxazoline) and a polyfunctional epoxide material.

9. A reverse osmosis or nano filtration polyamide composite membrane comprising a microporous support and a thin film polyamide layer including a surface, wherein at least a portion of said surface comprises a coating comprising a polymer comprising a poly(oxazoline) wherein said poly(oxazoline) comprises a repeating unit represented by Formula (II):

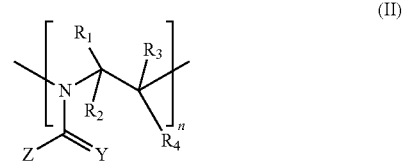

wherein:
n is an integer from 2 to 20,000;
$R_1$, $R_2$, $R_3$ and $R_4$ are each the same or different and are independently selected from: hydrogen, halogen, an alkyl group having from 1 to 4 carbon atoms, and an aryl group;
Y is selected from oxygen and sulfur; and
Z is selected from a group resulting in said polymer having solubility parameter greater than about $18 \, J^{1/2} cm^{-3/2}$ and wherein said poly(oxazoline) comprises a repeating unit of alkylene oxide represented by Formula (III):

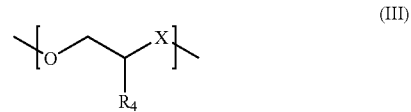

wherein X is a carbon atom or a chemical bond; and $R_4$ is selected from: hydrogen, alkyl group comprising 1 to 4 carbon atoms, hydroxyl group, and a hydroxylalkyl group having from 1 to 4 carbon atoms.

10. The membrane of claim 9 wherein at least 95 weight percent of said poly(oxazoline) comprises a repeating unit represented by Formula II, and equal to or less than about 5 weight percent of said copolymer comprises a repeating unit of alkylene oxide represented by Formula (III).

11. A reverse osmosis or nano filtration polyamide composite membrane comprising a microporous support and a thin film polyamide layer including a surface, wherein at least a portion of said surface comprises a coating comprising a reaction product of a polymer comprising a poly(oxazoline) and at least one of: i) a poly(alkylene oxide) material and ii) a polyfunctional epoxide material.

12. The membrane of claim 11 wherein said polymer comprises a reaction product of a poly(oxazoline) and a poly(alkylene oxide).

13. The membrane of claim 11 wherein said polymer comprises a reaction product of a poly(oxazoline) and a polyfunctional epoxide.

14. The membrane of claim 11 wherein said coating comprises a polymer blend comprising poly(oxazoline) and poly(alkylene oxide).

15. The membrane of claim 11 wherein said poly(oxazoline) comprises a repeating unit represented by Formula (II):

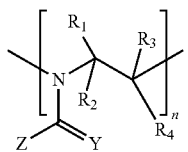

wherein:
  n is an integer from 2 to 20,000;
  $R_1$, $R_2$, $R_3$ and $R_4$ are each the same or different and are independently selected from: hydrogen, halogen, an alkyl group having from 1 to 4 carbon atoms, and an aryl group;
  Y is selected from oxygen and sulfur; and
  Z is selected from a group resulting in said polymer having solubility parameter greater than about 18 $J^{1/2}cm^{-3/2}$.

16. The membrane of claim 15 wherein $R_1$, $R_2$, $R_3$ and $R_4$ are each hydrogen; Y is oxygen; and n is an integer from 50 to 10,000.

17. The membrane of claim 15 wherein is Z is a solubilizing group.

18. The membrane of claim 15 wherein Z is an antimicrobial group.

19. The membrane of claim 15 wherein Z is selected from: hydrogen, an alkyl group having from 1 to 20 carbon atoms, an aryl group and a polyalkylene oxide group.

20. The membrane of claim 9 wherein $R_1$, $R_2$, $R_3$ and $R_4$ are each hydrogen; Y is oxygen; and n is an integer from 50 to 10,000.

21. The membrane of claim 9 wherein is Z is a solubilizing group.

22. The membrane of claim 9 wherein Z is an antimicrobial group.

23. The membrane of claim 9 wherein Z is selected from: hydrogen, an alkyl group having from 1 to 20 carbon atoms, an aryl group and a polyalkylene oxide group.

* * * * *